United States Patent
Ohk et al.

(10) Patent No.: US 7,899,247 B2
(45) Date of Patent: Mar. 1, 2011

(54) APPARATUS AND METHOD OF SEGMENTING AN IMAGE ACCORDING TO A COST FUNCTION AND/OR FEATURE VECTOR AND/OR RECEIVING A SIGNAL REPRESENTING THE SEGMENTED IMAGE IN AN IMAGE CODING AND/OR DECODING SYSTEM

(75) Inventors: Hyung-Soo Ohk, Seoul (KR); Jonghyon Yi, Yongin-si (KR); Charles A. Bouman, West Lafayette, IN (US); Eri Haneda, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1072 days.

(21) Appl. No.: 11/626,560

(22) Filed: Jan. 24, 2007

(65) Prior Publication Data
US 2008/0175476 A1 Jul. 24, 2008

(51) Int. Cl.
  G06K 9/34 (2006.01)
  G06K 9/46 (2006.01)
(52) U.S. Cl. .................................. 382/173; 382/176
(58) Field of Classification Search ............... 382/164, 382/166, 173, 176, 199, 224, 232, 233, 239; 358/1.15, 456, 462, 464; 375/240.18, E7.047, 375/E7.05; 341/50, 67
See application file for complete search history.

(56) References Cited

U.S. PATENT DOCUMENTS

| 5,640,468 | A | * | 6/1997 | Hsu ........................... 382/190 |
| 5,682,152 | A | * | 10/1997 | Wang et al. ................. 341/50 |
| 6,091,841 | A | * | 7/2000 | Rogers et al. ............... 382/132 |
| 6,324,305 | B1 | | 11/2001 | Holladay et al. |
| 6,373,981 | B1 | | 4/2002 | de Queiroz et al. |
| 6,400,844 | B1 | | 6/2002 | Fan et al. |
| 6,901,169 | B2 | | 5/2005 | Bottou et al. |
| 7,035,456 | B2 | * | 4/2006 | Lestideau .................. 382/164 |
| 2002/0064313 | A1 | * | 5/2002 | Cheng ....................... 382/239 |
| 2004/0114185 | A1 | | 6/2004 | Shiau et al. |
| 2005/0036694 | A1 | | 2/2005 | Li et al. |
| 2008/0069444 | A1 | * | 3/2008 | Wilensky .................... 382/173 |
| 2008/0175476 | A1 | * | 7/2008 | Ohk et al. ................... 382/176 |

FOREIGN PATENT DOCUMENTS

| EP | 1006717 | 6/2000 |
| EP | 1388816 | 2/2004 |
| KR | 2006-61036 | 6/2006 |

OTHER PUBLICATIONS

European Search Report, dated May 19, 2008.

(Continued)

*Primary Examiner*—Amir Alavi
(74) *Attorney, Agent, or Firm*—Stanzione & Kim, LLP

(57) ABSTRACT

An apparatus usable in an image encoding and decoding system includes segmentation unit to divide an image into one or more blocks, to segment the blocks into a binary mask layer of a foreground and a background according to a cost optimized function and a feature vector to generate a segmentation image according to the segmented blocks.

40 Claims, 9 Drawing Sheets

OTHER PUBLICATIONS

Julinda Gllavata Ralph Ewerth Bernd Freisleben: "A Text Detection, Localization and Segmentation System for OCR in Images" Multimedia Software Engineering, 2004. Proceedings. IEEE Sixth International Symposium on Miami, FL, USA Dec. 13-15, 2004, Piscataway, NJ, USA, IEEE, Dec. 13, 2004, pp. 310-317, XP010757265.

Simard p y et al.: "A Foreground/Background Separation Algorithm for Image Compression" Data Compression Conference, 2004. Proceedings. DCC 2004 Snowbird, UT, USA Mar. 23-25, 2004, Piscataway, NJ USA, IEEE, Mar. 23, 2004, pp. 498-507, XP010692577.

Eri Haneda, Jonghyon Yi, and Charles A. Bouman: "Segmentation for MRC Compression" Color Imaging XII: Processing, Hardcopy, and Applications, Proc. of SPIE-IS&T Electronic Imaging, vol. 6493, Jan. 29, 2007, XP002474960.

* cited by examiner

Original image

Initial segmentation
(Binary mask)

Original image

COS segmentation results

APPARATUS AND METHOD OF SEGMENTING AN IMAGE ACCORDING TO A COST FUNCTION AND/OR FEATURE VECTOR AND/OR RECEIVING A SIGNAL REPRESENTING THE SEGMENTED IMAGE IN AN IMAGE CODING AND/OR DECODING SYSTEM

BACKGROUND OF THE INVENTION

1. Field of the Invention

The present invention relates to an apparatus and method of segmenting an image and/or receiving the segmented image in an image coding and/or decoding system, and more particularly, to an apparatus and method of dividing an image into blocks, defining the respective blocks using cost optimized segmentation and connected component classification to generate a segmentation image, and receiving a signal representing the segmentation image in a mixed raster content based coding and/or decoding system.

2. Description of the Related Art

Mixed raster content (MRC), defined in ITU-T T.44, is a standard for efficient document compression which can dramatically improve the compression/quality tradeoff as compared to traditional lossy image compression algorithms. MRC represents an image as a set of layers. In the most basic mode of MRC, a compound document with text and pictures is separated into three layers: a binary mask layer, a foreground layer and a background layer. The binary mask layer indicates the assignment of foreground as "1", or background as "0" to each pixel. According to ITU-T T.44, it is recommended that text and line art be classified to the foreground layer, and pictures classified to the background.

The procedure to create the binary mask layer is called segmentation. After the segmentation, each layer may be compressed by an appropriate encoder to create an MRC document. For example, the foreground and background layers may be encoded using JPEG or JPEG2000, while the binary mask layer may be encoded using JBIG or JBIG2.

The segmentation is a process of MRC encoding to differentiate text and graphics regions within an image and creates the binary mask layer described above. Typically, the foreground layer contains the colors of text, the background layer contains images and graphics, and the binary mask layer is used to represent the fine detail of text fonts. The quality of the decoded image is heavily dependent on the segmentation algorithm because the binary mask layer defines the shape of characters, and because incorrect segmentation can cause distortion in the decoded image.

Although the segmentation is a critical step in the MRC encoding, the standard ITU-T T.44 does not define a segmentation method. Instead, the standard ITU-T T.44 only defines a structure of an MRC document decoder, so any segmentation algorithm may be independently optimized for best performance.

There are a variety of desirable attributes for segmentations used in the document compression. For the purposes of illustration, binary segmentation is explained, but multi-layer segmentations can also be applicable to the document compression. The attributes may be more or less important depending on requirements of the application. The desirable attributes are listed below.

One of the attributes is segmentation edges along text and graphics boundaries—A good segmentation will contain transitions at the locations of text and graphics edges. The edge in the segmentation allows for accurate and high resolution encoding of text edges even when the foreground and background layers are coded at low resolution and low quality, as is desirable to reduce the total bits per pixel for the encoded document.

Another one of the attributes is spatially smooth segmentation—the segmentation to be spatially smooth for two reasons. First, a smooth segmentation can be encoded more efficiently by a binary image encoder, thereby reducing the total bits per pixel in the encoded document. Second, the spurious edges in the segmentation can cause defects in the final decoded document because of inconsistencies between the foreground and background images at the locations where they are seamed together.

Another one of the attributes is image regions reliably classified to the background layer—It is useful to consistently have image regions classified to the background layer since the sub-sampling, data-filling, and coding of the background layer is often optimized for compression of natural images.

Another one of the attributes is text regions reliably classified to the foreground layer—It is useful to consistently have text regions classified to the foreground layer since the sub-sampling, data-filling, and coding of the foreground layer is often optimized for compression of the text-font fill colors.

Another one of the attributes is accurate representation of textual and/or graphic content. In some applications, the segmentation layer is used to analyze the document's content. In these cases, it is useful that the segmentation accurately represent the textual and/or graphic content of the document.

For many MRC applications, it is important that the segmentation contain only text in the foreground plane (i.e., mask pixels which are labeled as "1"), and all other regions of the document should be in the background plane (i.e., mask pixels which are labeled as "0") since in some applications, proper labeling of text and only text as foreground both improves the quality of the decoded document and reduces the bit rate (i.e., the number of bits per pixel of the encoded document). Unfortunately, conventional segmentation methods have made errors. These errors can take two forms. For example, text may be erroneously segmented as background, and background may be erroneously segmented as foreground.

FIG. 1 is a view illustrating errors in a binary mask in a convention image coding apparatus, as an example of misclassifications of the binary mask. Black regions indicate a label of "1" and white regions indicate a label of "0". In this example, most of the text regions are properly segmented as foreground but some edges embedded in the picture regions are also segmented as foreground because of overly sensitive edge detection. Notice that the foreground portion of the segmentation can be described by a set of connected components, where each connected component represents a set of adjacent pixels in the mask that are all labeled as foreground (i.e., "1"). Using this property, an approach to reduce errors in the binary mask is to eliminate the connected components which are erroneously classified as foreground.

SUMMARY OF THE INVENTION

The present general inventive concept provides an apparatus and method of segmenting an image in an image coding and/or decoding system.

The present general inventive concept also provides an apparatus and method of segmenting an image in a mixed raster content based coding and/or decoding system.

The present general inventive concept also provides an apparatus and method of segmenting an image using cost optimized segmentation and/or connected component classification in an image coding and decoding system.

The present general inventive concept also provides an apparatus and method of dividing an image into blocks and defining the respective blocks using cost optimized segmentation in a mixed raster content based image coding and/or decoding system The present general inventive concept also provides an apparatus and method of dividing an image into block and defining the image of the respective blocks using connected component classification in a mixed raster content based image coding and/or decoding system.

The present general inventive concept also provides an image coding and/or decoding system to segment an image and/or receive a signal representing the segmented image using mixed raster content and at least one of cost optimized segmentation and connected component classification.

The present general inventive concept also provides a method and apparatus to reduce an error in a binary mask in an image coding and/or decoding system.

The present general inventive concept also provides a method and apparatus to reliably classify pixels of a binary mask layer into a foreground and a background in an image coding and/or decoding system.

The present general inventive concept also provides a method and apparatus to reliably extract a text region from a binary mask layer in an image coding and/or decoding system.

The present general inventive concept also provides a method and apparatus to increase efficiency in extracting a text region and to reduce an error in detecting the text region and a non-text region in an image coding and/or decoding system.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept may be achieved by providing an apparatus usable in an image encoding and decoding system, including a segmentation unit to divide an image into one or more blocks, to segment the blocks of the image into a binary mask layer of a foreground and a background according to a cost optimized function and a feature vector of the respective blocks, so as to generate an segmentation image.

The segmentation unit may include a divider to divide the image into the one or more blocks, and the one or more blocks are disposed adjacent to each other to overlap each other in first and second directions.

The segmentation unit may include a divider to divide the image into the one or more blocks, and each of the one or more blocks comprises same pixels of one or more overlapping areas with the adjacent blocks in at least one of first and second directions.

The segmentation unit may include a cost optimized segmentation (COS) unit to define the respective blocks as segmentation candidates, and to modify the segmentation candidates according to the cost optimized function.

The COS unit may include a first segmentation unit to define the respective blocks as the segmentation candidates according to a classification of the blocks, and a second segmentation unit to modify the segmentation candidates according to the cost optimized function.

The cost optimized function may correspond to features of the image and consistency of segmentation between neighboring blocks.

The cost optimized function may correspond to attributes of the blocks, and the attributes of the blocks comprise one of segmentation edges along text and graphics boundaries, a spatially smooth segmentation, an image region classified to a background layer, a text region classified to a foreground layer, an accurate representation of a textual and/or graphic content.

The cost optimized function may correspond to the number of mismatches between pixels in an overlap region of the adjacent blocks.

The cost optimized function may correspond to a variance of pixels in an overlap region of the adjacent blocks.

The cost optimized function may correspond to a constancy of the neighboring blocks.

The segmentation unit may modify the blocks according to the cost optimized function to control an image quality and a compression rate of the segmentation image.

The segmentation unit may include a connected component classification (CCC) unit to modify an initial segmentation image according to the feature vector of the initial segmentation image to generate the segmentation image.

The CCC unit may extract connected components of the adjacent blocks and calculates the feature vector of the respective blocks according to the connected components.

The CCC unit may classify pixel data of the blocks of the image according to the feature vector to modify the pixel data of the blocks to generate the segmentation image according to the modified pixel data.

The CCC unit may compare the feature vector with a reference vector to modify the pixel data of the blocks of the image.

The CCC unit may classify a region of the initial segmentation image segmented according to the cost optimized function into a text region and a non-text region according to the feature vector of the adjacent regions of the initial segmentation image.

The feature vector comprises a text symbol vector and a non-text symbol vector.

The segmentation unit may further modify the respective blocks segmented according to the cost optimized function, according to the feature vector to output the segmentation image according to the modified blocks.

The segmentation unit may modify the blocks according to the feature vector in order to control a false alarm probability and a correct detection probability of the segmentation image.

The apparatus may further include a scanning unit to scan a document to generate a signal corresponding to the image.

The apparatus may further include a printing unit to print a signal corresponding to the output image.

The foregoing and/or other aspects of the present general inventive concept may also be achieved by providing an apparatus usable in an image encoding and decoding system, including a segmentation unit to divide an image into one or more blocks, to segment the blocks into a binary mask layer of a foreground and a background according to a cost optimized function, so as to generate an output image according to the segmented blocks.

The foregoing and/or other aspects of the present general inventive concept may also be achieved by providing an apparatus usable in an image encoding and decoding system, including a segmentation unit to divide an image into one or more blocks, to segment the blocks into a binary mask layer of one or more foregrounds and one or more backgrounds according to a feature vector, so as to generate a segmentation image according to the segmented blocks.

The foregoing and/or other aspects of the present general inventive concept may also be achieved by providing an apparatus usable in an image encoding and decoding system, including a decoding unit to decode an image signal encoded from the segmentation image of the segmented blocks according to a cost function and a feature vector, so as to generate a decoded image.

The apparatus may further include a printing unit to print the decoded image on a printing medium.

The foregoing and/or other aspects of the present general inventive concept may also be achieved by providing an apparatus usable in an image encoding and decoding system, the apparatus including a segmentation unit to divide an image into one or more blocks, to segment the blocks into a binary mask layer of one or more foregrounds and one or more backgrounds according to a cost optimized function and a feature vector, so as to generate a segmentation image according to the segmented blocks, and a decoding unit to decode a signal corresponding to the segmentation image formed from the segmented blocks according to the cost function and the feature vector, so as to generate a decoded image.

The apparatus may further include a printing unit to print the decoded image on a printing medium.

The apparatus may further include a scanning unit to scan a document to generate a signal corresponding to the image.

The foregoing and/or other aspects of the present general inventive concept may also be achieved by providing a method of an image encoding and decoding system, the method including dividing an image into one or more blocks, and segmenting the blocks into a binary mask layer of a foreground and a background according to a cost optimized function and a feature vector, so as to generate a segmentation image according to the segmented blocks.

The foregoing and/or other aspects of the present general inventive concept may also be achieved by providing a method of an image encoding and decoding system, the method including dividing an image into one or more blocks, and segmenting the blocks into a binary mask layer of a foreground and a background according to a cost optimized function, so as to generate a segmentation image according to the segmented blocks.

The foregoing and/or other aspects of the present general inventive concept may also be achieved by providing a method of an image encoding and decoding system, the method including dividing an image into one or more blocks, and segmenting the blocks into a binary mask layer of a foreground and a background according to a feature vector, so as to generate a segmentation image according to the segmented blocks.

The foregoing and/or other aspects of the present general inventive concept may also be achieved by providing a method of an image encoding and decoding system, the method including decoding an image signal encoded from a segmentation image according to a cost function and a feature vector, so as to generate a decoded image, and printing the decoded image on a printing medium.

The foregoing and/or other aspects of the present general inventive concept may also be achieved by providing a method of an image encoding and decoding system, the method including dividing an image into one or more blocks, segmenting the blocks into a binary mask layer of a foreground and a background according to a cost optimized function and a feature vector, so as to generate a segmentation image according to the segmented blocks, and decoding a signal corresponding to the segmentation image of the segmented blocks according to the cost function and the feature vector, so as to generate a decoded image.

The foregoing and/or other aspects of the present general inventive concept may also be achieved by providing a computer readable recoding medium containing computer readable codes as a program to execute a method of an image encoding and decoding system, the method including dividing an image into one or more blocks, and segmenting the blocks into a binary mask layer of a foreground and a background according to a cost optimized function and a feature vector, so as to generate a segmentation image according to the segmented blocks.

The foregoing and/or other aspects of the present general inventive concept may also be achieved by providing a computer readable recoding medium containing computer readable codes as a program to execute a method of an image encoding and decoding system, the method including dividing an image into one or more blocks, and segmenting the blocks into a binary mask layer of a foreground and a background according to a cost optimized function, so as to generate a segmentation image according to the segmented blocks.

The foregoing and/or other aspects of the present general inventive concept may also be achieved by providing a computer readable recoding medium containing computer readable codes as a program to execute a method of an image encoding and decoding system, the method including dividing an image into one or more blocks, and segmenting the blocks into a binary mask layer of a foreground and a background according to a feature vector, so as to generate a segmentation image according to the segmented blocks.

The foregoing and/or other aspects of the present general inventive concept may also be achieved by providing a computer readable recoding medium containing computer readable codes as a program to execute a method of an image encoding and decoding system, the method including decoding an image signal encoded from a segmentation image of segmented blocks according to a cost function and a feature vector, so as to generate a decoded image, and printing the decoded image on a printing medium.

The foregoing and/or other aspects of the present general inventive concept may also be achieved by providing a computer readable recoding medium containing computer readable codes as a program to execute a method of an image encoding and decoding system, the method including dividing an image into one or more blocks, segmenting the blocks into a binary mask layer of a foreground and a background according to a cost optimized function and a feature vector, so as to generate a segmentation image according to the segmented blocks, and decoding a signal corresponding to the segmentation image of the segmented blocks according to the cost function and the feature vector, so as to generate a decoded image.

The foregoing and/or other aspects of the present general inventive concept may also be achieved by providing an apparatus usable in an image encoding and decoding system, the apparatus including a segmentation unit to divide an image into one or more blocks, to segment and adjust pixel data of the blocks into a binary mask layer of a foreground and a background according to the number of mismatches of the adjacent blocks, so as to generate a segmentation image according to the segmented blocks.

The foregoing and/or other aspects of the present general inventive concept may also be achieved by providing an apparatus usable in an image encoding and decoding system, the apparatus including a segmentation unit to divide an image into one or more blocks, to segment the blocks into a binary mask layer of a foreground and a background according to a feature vector, so as to generate a segmentation image according to the segmented blocks.

BRIEF DESCRIPTION OF THE DRAWINGS

The above and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
FIG. 1 is a view illustrating errors in a binary mask in a convention image coding apparatus.
Figure 1:
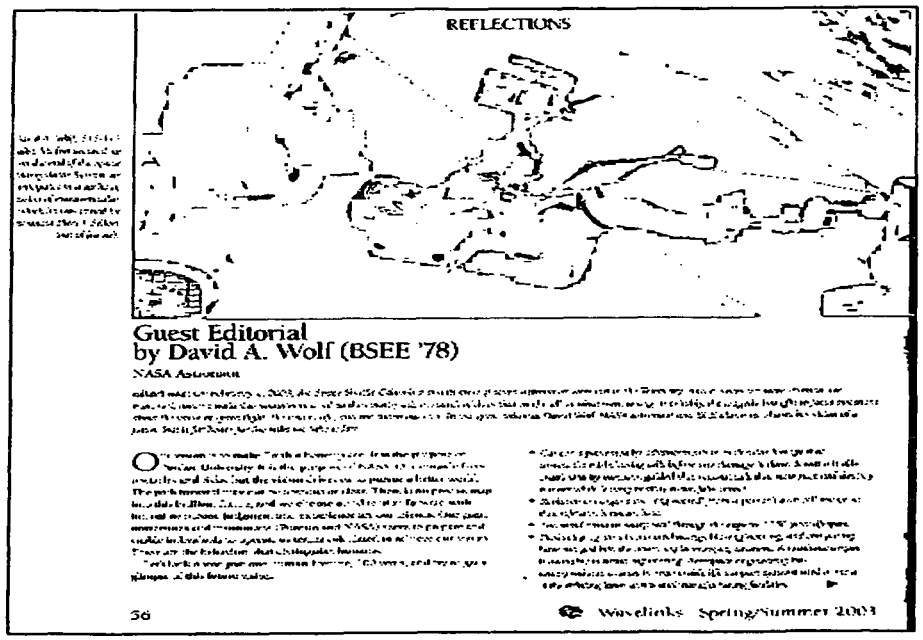

Reference will now be made in detail to the embodiments of the present general inventive concept, examples of which are illustrated in the accompanying drawings, wherein like reference numerals refer to like elements throughout.

Figure 2:
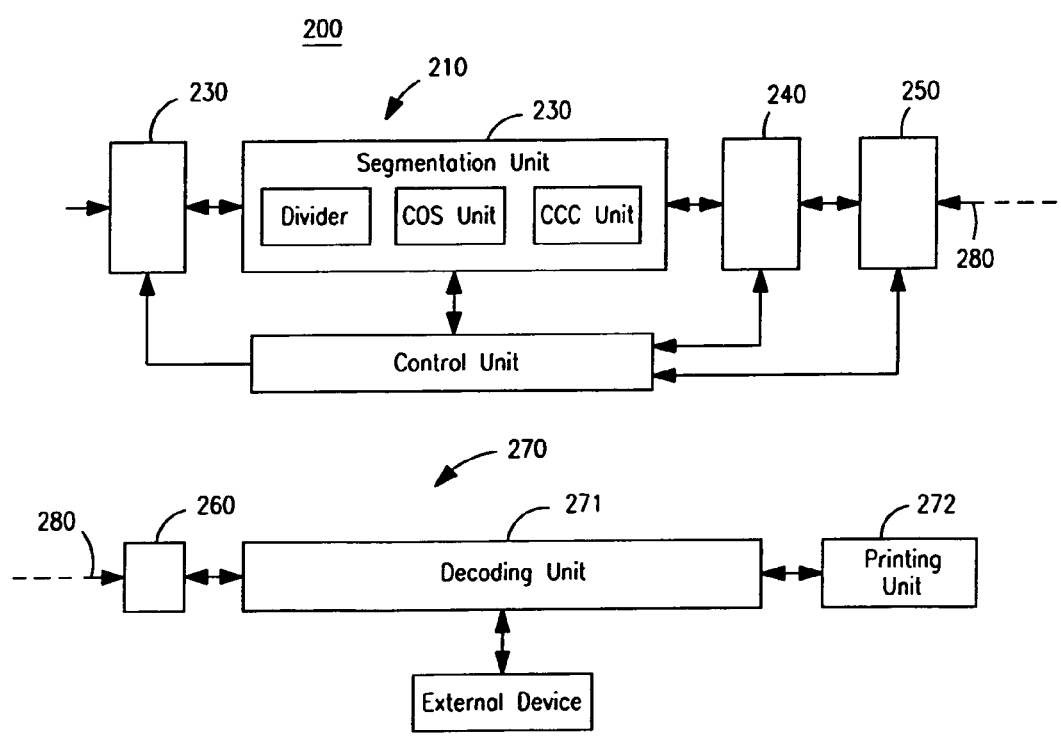
FIG. 2 is a block diagram illustrating an image coding and/or decoding system according to an embodiment of the present general inventive concept.

FIG. 2 is a block diagram illustrating an image coding and/or decoding system according to an embodiment of the present general inventive concept. Referring to FIG. 2, the image coding and/or decoding system may be an apparatus using mixed raster content (MRC), defined in ITU-T T.44, to generate a compressed image or document. In MRC encoding, an image is represented as a set of layers, for example, a binary mask layer, a foreground layer, and a background layer. The binary mask layer includes one or more foregrounds and one or more backgrounds, for example, pixel values of 1 and 0 to represent the foreground and the background, respectively. The present embodiment performs segmentation on the binary mask layer to change or adjust pixel values of blocks of the binary mask layer according to cost optimized segmentation (COS) and connected component classification (CCC) which will be described later. Each pixel of the binary mask layer may have a value representing a foreground pixel or a background pixel to form the binary mask layer. The foreground pixel of the binary mask layer can be represented by the foreground layer, and the background pixel of the binary mask layer can be represented by the background layer.

The image coding and/or decoding system may include an encoding apparatus 210 and a decoding apparatus 270. The encoding apparatus 210 may include a scanning unit 220, a segmentation unit 230, an encoding unit 240, and a transmitting and/or receiving unit 250 and 260. The decoding apparatus 270 may include a transmitting and/or receiving unit 260, a decoding unit 271, and a printing unit 272. The transmitting and/or receiving units 250 and 260 are connected through a line 280, such as a circuit, a wire network, or a wireless network. The segmentation unit 230 may include a divider 231, a cost optimized segmentation (COS) unit 232, and a connected component classification (CCC) unit 233. The COS unit 232 and the CCC unit 233 may be selectively used in the segmentation unit 230.

The segmentation unit 230 may receive image data from the scanning unit 220 or an external device to segment the image data. The image data may represent a page image or a portion of the page image. The scanning unit 220 may include a document feeder to feed a document, and a scanner to scan the fed document to generate a signal as the image data.

The divider 231 may divide the image data having a number of pixels into one or more blocks each having a predetermined number of the pixels. The adjacent blocks may overlap each other to have same pixels. That is, the same pixels of the image data may be included in the adjacent blocks. Each pixel may have a value representing a foreground pixel or a background pixel to form the binary mask layer.

The COS unit 232 segments the blocks of the image data according to the cost optimized segmentation (COS). The COS unit 232 may define the respective blocks as segmentation candidates for segmentation, for example, four segmentation candidates, and then determine the segmentation candidates as final segmentations according to a global cost minimization, for example, cost optimized segmentation. The pixels of the respective blocks are segmented into the foreground pixel and the background pixel, for example, values of 1 or 0. The segmentations may be original, reversed, all foreground, and all-background. The pixels of the respective blocks may be changed from the foreground pixel to the background pixel or from the background pixel to the foreground pixel, for example, 0 to 1 or 1 to 0, according to the segmentations. All pixels of the respective blocks may be set to the foreground pixel or the background pixel when the respective blocks are set to the all foreground and the all-background, respectively. The COS unit 232 generates a segmentation image formed from the segmented blocks having the adjusted pixels.

The CCC unit 233 processes the segmentation image or the segmented blocks of the image date according to the connected component classification (CCC). The CCC unit 233 may extract one or more connected components from the segmentation image or the segmented blocks, classify the extracted connected components as either a text or a non text according to a feature vector representing one or more attributes of the respective connected components, and adjust the segmentation image of the COS unit 232 such that pixels of the segmentation image can be adjusted according to the feature vector. The connected components can be extracted from the adjacent blocks or the adjacent regions of an image formed as the segmentation image. It is possible that a conventional segmentation unit or another segmentation unit, which is different from the COS unit 232, can be connected between the divider 231 and the CCC unit 233 to generate the segmented image such that the CCC receives the segmentation image from the conventional segmentation unit and performs the CCC on the segmentation image.

A final segmentation image can be formed from the COS unit 232 and/or the CCC unit 233. That is, the final segmentation image can be formed from the segmentation image of the blocks in which values of the pixels are adjusted or changed. Since the pixels are shared by the adjacent blocks, the commonly shared pixels of the adjacent blocks may be changed differently, and the differently changed pixels of the adjacent blocks are adjusted so that the adjacent blocks are combined to form an image representing the final segmentation mage.

The encoding unit 240 encodes the final segmentation image formed from the COS unit 232 and/or the CCC unit 233, as well as the background layer and the foreground layer, using corresponding encoding algorithms, and outputs an encoded signal representing the final segmentation image of the binary mask layer, the background layer, and the foreground layer, to the decoding apparatus 270 or an external device through the transmitting and/or receiving unit 250 and the line 280.

The decoding unit 271 receives the encoded signal from the encoding apparatus 210 or an external device, and decodes the signal representing the binary mask layer, the background layer, and the foreground layer, to reproduce a decoded image. The reproduced image may be printed on a printing medium in the printing unit 272, and may be output to another external device. The printing unit 272 may be a printer, a facsimile, a multi-functional apparatus, etc.

A method of the image coding and/or decoding system of FIG. 2 may include dividing an image into blocks and performing the COS on the blocks to generate a segmentation image formed according to the segmented blocks. The method may include performing the CCC on a segmentation image from to generate another final segmentation image as a binary mask layer, encoding a signal including the binary mask layer together with a background layer and a foreground layer, transmitting the encoded signal, receiving the encoded signal, decoding the received signal to reproduce an image, and/or printing the reproduced image on a printing medium.

Figure 3:
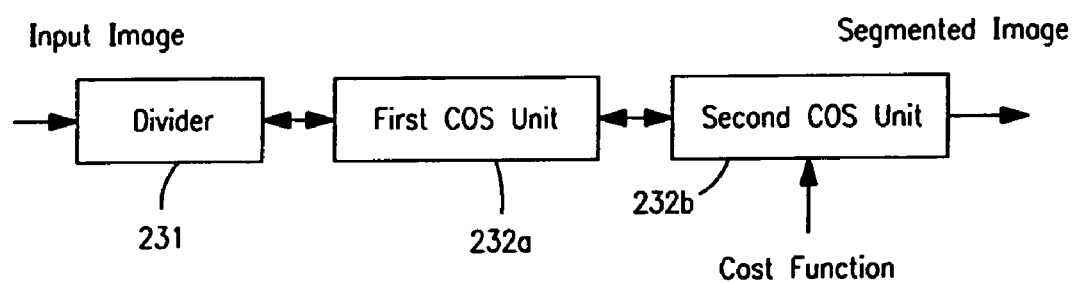
FIG. 3 is a block diagram illustrating a segmentation unit of the image coding and/or decoding system of FIG. 2 according to an embodiment of the present general inventive concept.

FIG. 3 is a block diagram illustrating the segmentation unit 230 of the encoding apparatus 210 of the image coding and/or decoding system 200 of FIG. 2 according to an embodiment of the present general inventive concept. Referring to FIGS. 2 and 2, the segmentation unit 230 may include the divider 231 and the COS unit 232 having a first COS unit 232a and a second COS unit 232b.

A segmentation algorithm is used in the segmentation unit 230 to perform the COS to segment the blocks of the image data, and is formulated for optimization of a cost function to perform the COS. The segmentation algorithm may be stored in the segmentation unit 230 or a memory of the segmentation unit 230 or the encoding apparatus 210, and the cost function may be stored in a control unit of the segmentation unit 230 or the encoding apparatus 210, and is applied to the second COS unit 232b of the COS unit 232. The input image is divided into the blocks in the divider 231, and the four possible candidates for the segmentation are defined for the respective blocks in the first COS unit 232a as an initial segmentation. Then, the final segmentation of the respective blocks is determined for the entire image corresponding to the input image data, using a global cost minimization procedure. The global cost minimization procedure represents the minimization of the cost function in order to favor segmentations that have desirable attributes. The cost function is applied to the second COS unit 232b to perform the COS on the respective blocks.

Since pixels are commonly shared by adjacent blocks when the image is divided into the blocks, values of the pixels are changed from foreground to background or from the background to the foreground when the blocks are combined into an image representing the final segmentation image, according to the COS. For example, the commonly shared pixels of the adjacent blocks can be changed simultaneously to have the same values, and the adjacent blocks having the simultaneously changed shared pixel values are combined into the image as the binary mask layer.

Figure 4:
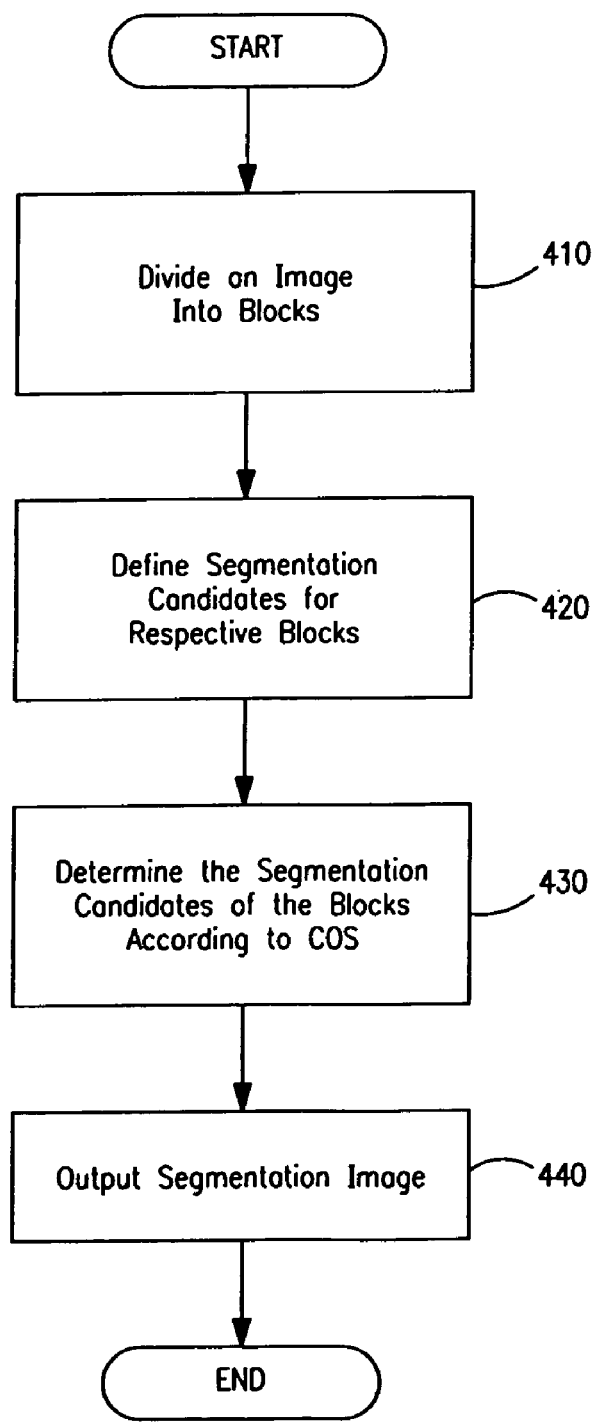
FIG. 4 is a flowchart illustrating a method of a segmentation unit of an image coding and/or decoding system according to an embodiment of the present general inventive concept.

FIG. 4 is a flowchart illustrating a method of a segmentation unit of an image coding and/or decoding system according to an embodiment of the present general inventive concept. Referring to FIGS. 2-4, the method performs the COS on the respective blocks with the corresponding segmentation candidates, using the cost function to reduce a compression rate without reducing quality of an encoded image signal of the encoding apparatus 210.

According to a cost optimized segmentation (COS) algorithm to perform the COS, the image date is first divided into the overlapping blocks in operation 410. In each block, the pixels are segmented into foreground ("1") or background ("0") pixels. Each block is segmented independently using any one of a variety of different methods, so that pixels are separated based on the local color or edge characteristics.

At operation 420, several segmentation classes (i.e., segmentation candidates) are defined for the respective blocks. For example, the classes of the respective blocks may be "original," "reversed," "all foreground," and "all-background," as original binary segmentation. If the block class is "original," the original binary segmentation of the block is retained. If the block class is "reversed," then the class of each pixel in the block is reversed (i.e., changes from "1" to "0" or from "0" to "1"). If the block class is set to "all foreground" or "all background," then the pixels in the block are set to all 1's or all 0's respectively. Once the class of each block is determined, then the final segmentation is determined by seaming together the results from each segmented block.

In the final segmentation, the selection of the class of each block is based on minimization of a global cost function at operation 430. The cost function may depend upon features of an image and consistency of segmentation between neighboring blocks. In general, the cost function is designed so that the cost is reduced when the segmentation has the desirable attributes, for examples, segmentation edges along text and graphics boundaries, spatially smooth segmentation, image regions reliably classified to the background layer, text regions reliably classified to the foreground layer, and accurate representation of textual and/or graphic content, as described in a conventional image forming system. The specific design of the cost function may depend on the specific application and the desired attributes in the segmentation. Once the cost function is designed, a method, such as dynamic programming, may be used to find the block classes, which approximately or exactly minimize the cost function. At operation 440, a segmented image is output using the finally segmented blocks.

The segmented image may be an image formed from the segmented blocks having the pixels. The segmented image may include a text region and/or a non-text region formed from a combination of the segmented blocks. The segmented image and the segmentation image can be called as segmentation image. The compression ratio of the segmented image can be increased since the blocks are processed according to the COS algorithm.

The advantage of the COS algorithm is that it can be made robustness under various image conditions such as gradation or fine lines since no assumptions or restrictions are placed on input images. Another advantage is the flexibility of the cost function for future improvements.

According to the present embodiment, the above described apparatus and method formulates the final segmentation according to the optimization of the cost function. The cost function is designed so that the cost is reduced when the segmentation has the desirable attributes. A manufacturer of the encoding apparatus or the image coding and/or decoding system may define the cost function according to a desirable layer separation. Since the cost function can be modified by adding new terms and changing the coefficients to an original cost function formula, the segmentation algorithm can be customized to control a quality and a compression ratio of the image data. According to the present embodiment, characteristics of the segmentation can be adjusted for particular applications through systematic optimization of parameters of the cost function.

With respect to the optimization, the segmentation algorithm first proposes several segmentation candidates for each block. The final segmentation is determined by choosing only one candidate which optimizes the cost function. The segmentation candidates may also be defined according to the specifications of the desirable layer separation or other criteria. For example, for multi-layer segmentation, more number of the segmentation candidates may be proposed. A dynamic optimization process, such as dynamic programming, can be used according to one of the optimal selections of the segmentation.

As described above, the cost optimized segmentation (COS) method provides a computationally efficient method to do accurate segmentation of complex documents for an MRC encoding process of the image data in the image encoding and/or decoding system. Also, the COS method allows the quality of segmentation and the computation speed to be controlled separately through choices of the cost function and optimization method, respectively. More accurate segmentation provides better quality and compression ratio for large MRC documents. This in turn allows multifunction printers to store and transmit large documents with fewer bits.

An example of a specific cost function and associated optimization procedure is described below. As the first process of the segmentation, an input image is divided into a sequence of overlapping blocks, $O_{i,j}$ where $i=1, \ldots, M$, $j=1, \ldots, N$. Each block, $O_{i,j}$, is assumed to be a m×m array of original RGB or other color axis values and the blocks are selected to overlap by m/2 pixels in both horizontal and vertical directions. If the height and width of the input image cannot be divided by m, padding with zeros is performed.

After constructing a block sequence, the color component which has the largest variance is selected for each block $O_{i,j}$ and a gray image is rendered for each block. Each block is segmented into two classes using a clustering method. The clustering method classifies each pixel in $O_{i,j}$ using a threshold, and the threshold is selected to minimize the total subclass variance, $\gamma^2_{i,j}$, defined by the following formula.

$$\gamma^2_{i,j} = \frac{N_{0,i,j} \times \sigma^2_{0,i,j} + N_{1,i,j} \times \sigma^2_{1,i,j}}{N_{0,i,j} + N_{1,i,j}}$$

where $N_{0,i,j}$ and $N_{1,i,j}$ are number of pixels classified as 0 and 1, and "i,j" and "i,j" are the variances within each group. The result is represented by $\tilde{C}_{i,j} \in \{0,1\}^{m \times m}$ which assigns a binary value to each pixel in the block.

The final segmentation is chosen from the modified block classifications $\tilde{C}_{i,j}$. For example, four possible choices can be defined for the modification of each block, which are specified by a class $s_{i,j}$. Class 0 is the original block, and class 1 is a reversed version. Class 2 and class 3 specify that the block is all background or all foreground as follows.

$s_{i,j}=0 \Rightarrow \tilde{C}_{i,j}=C_{i,j}$
$s_{i,j}=1 \Rightarrow \tilde{C}_{i,j}=-C_{i,j}$
$s_{i,j}=2 \Rightarrow \tilde{C}_{i,j}=$ All 0
$s_{i,j}=3 \Rightarrow \tilde{C}_{i,j}=$ All 1

The optimal class is selected by minimizing the cost function. An example cost function is shown below. This example cost function contains four terms.

$$f = \sum_{i=1}^{M} \sum_{j=1}^{N} \{\lambda_1(V^{(1)}_{i,j}(s_{i,j-1}, s_{i,j})) + \lambda_2(V^{(2)}_{i,j}(s_{i-1,j}, s_{i,j})) + \lambda_4 V^{(4)}_{i,j}(s_{i,j}) + \lambda_5 MSE_{i,j}(s_{i,j})\}$$

where $V_{i,j}$ stands for the number of the mismatches between pixels in the overlapping region between two blocks that are horizontally adjacent. Similarly, $V\square_{i,j}$ stands for the number of the mismatches between pixels in the overlapping region between two blocks that are vertically adjacent. By minimizing these terms, the segmentation of each block may be made most consistent with neighboring blocks.

The followings are specific terms used for the calculation of $V^{(1)}_{i,j}$ and $V^{(2)}_{i,j}$ terms.

$H_{i,j}$=Number of mismatches between pixels in the right overlap region of $C_{i,j-1}$ and the left overlap region of $C_{i,j}$ $V_{i,j}$=Number of mismatches between pixels in the bottom overlap region of $C_{i-1,j}$ and the top overlap region of $C_{i,j}$ $R_{i,j}$=Number of 1's in the right overlap region of $C_{i,j}$ $L_{i,j}$=Number of 1's in the left overlap region of $C_{i,j}$ $T_{i,j}$=Number of 1's in the top overlap region of $C_{i,j}$ $B_{i,j}$=Number of 1's in the bottom overlap region of $C_{i,j}$ $\square_{i,j}$=variance of gray levels in the block corresponding to $C_{i,j}$ $$V^1_{i,j}(s_{i,j-1}, s_{i,j}) =$$

$$\begin{cases} H_{i,j} & \text{if } (s_{i,j-1}=0 \text{ and } s_{i,j}=0) \text{ or } (s_{i,j-1}=1 \text{ and } s_{i,j}=1) \\ m(m/2) - H_{i,j} & \text{if } (s_{i,j-1}=0 \text{ and } s_{i,j}=1) \text{ or } (s_{i,j-1}=1 \text{ and } s_{i,j}=0) \\ R_{i,j} & \text{if } (s_{i,j-1}=0 \text{ and } s_{i,j}=2) \text{ or } (s_{i,j-1}=1 \text{ and } s_{i,j}=3) \\ m(m/2) - R_{i,j} & \text{if } (s_{i,j-1}=0 \text{ and } s_{i,j}=3) \text{ or } (s_{i,j-1}=1 \text{ and } s_{i,j}=2) \\ L_{i,j} & \text{if } (s_{i,j-1}=2 \text{ and } s_{i,j}=0) \text{ or } (s_{i,j-1}=3 \text{ and } s_{i,j}=1) \\ m(m/2) - L_{i,j} & \text{if } (s_{i,j-1}=3 \text{ and } s_{i,j}=0) \text{ or } (s_{i,j-1}=2 \text{ and } s_{i,j}=1) \\ 0 & \text{if } (s_{i,j-1}=2 \text{ and } s_{i,j}=2) \text{ or } (s_{i,j-1}=3 \text{ and } s_{i,j}=3) \\ m(m/2)\frac{\sigma^2_{i,j-1} + \sigma^2_{i,j}}{2\lambda^2_3} & \text{if } (s_{i,j-1}=2 \text{ and } s_{i,j}=3) \text{ or } (s_{i,j-1}=3 \text{ and } s_{i,j}=2) \end{cases}$$

-continued $$V_{i,j}^2(s_{i-1,j}, s_{i,j}) = \begin{cases} V_{i,j} & \text{if } (s_{i-1,j} = 0 \text{ and } s_{i,j} = 0) \text{ or} \\ & (s_{i-1,j} = 1 \text{ and } s_{i,j} = 1) \\ m(m/2) - V_{i,j} & \text{if } (s_{i-1,j} = 0 \text{ and } s_{i,j} = 1) \text{ or} \\ & (s_{i-1,j} = 1 \text{ and } s_{i,j} = 0) \\ B_{i-1,j} & \text{if } (s_{i-1,j} = 0 \text{ and } s_{i,j} = 2) \text{ or} \\ & (s_{i-1,j} = 1 \text{ and } s_{i,j} = 3) \\ m(m/2) - B_{i-1,j} & \text{if } (s_{i-1,j} = 0 \text{ and } s_{i,j} = 3) \text{ or} \\ & (s_{i-1,j} = 1 \text{ and } s_{i,j} = 2) \\ T_{i,j} & \text{if } (s_{i-1,j} = 2 \text{ and } s_{i,j} = 0) \text{ or} \\ & (s_{i-1,j} = 3 \text{ and } s_{i,j} = 1) \\ m(m/2) - T_{i,j} & \text{if } (s_{i-1,j} = 3 \text{ and } s_{i,j} = 0) \text{ or} \\ & (s_{i-1,j} = 2 \text{ and } s_{i,j} = 1) \\ 0 & \text{if } (s_{i-1,j} = 2 \text{ and } s_{i,j} = 2) \text{ or} \\ & (s_{i-1,j} = 3 \text{ and } s_{i,j} = 3) \\ m(m/2)\frac{\sigma_{i-1,j}^2 + \sigma_{i,j}^2}{2\lambda_3^2} & \text{if } (s_{i-1,j} = 2 \text{ and } s_{i,j} = 3) \text{ or} \\ & (s_{i-1,j} = 3 \text{ and } s_{i,j} = 2) \end{cases}$$

The value of the function $\text{MSE}_{i,j}(s_{i,j})$ is given by $$\text{MSE}_{i,j}(s_{i,j}) = \begin{cases} \gamma_{i,j}^2 & \text{if } s_{i,j} = 0 \text{ or } s_{i,j} = 1 \\ \lambda_6 \sigma_{i,j}^2 & \text{if } s_{i,j} = 2 \\ \sigma_{i,j}^2 & \text{if } s_{i,j} = 3 \end{cases}$$

where $\square_{i,j}$ is the total variance of the block, $\square$ is a positive constant less than one, and $\square_{i,j}$ as previously defined in the clustering method. The reduced value of MSE for class 2 (background) is for the case when we would like to assign more picture regions to the background.

$V^{(4)}_{i,j}$ denotes the number of the pixels classified as foreground. This cost panelizes segmentations that assign too many pixels to the foreground.

The values of $\lambda_1$, $\lambda_2$, $\lambda_3$, $\lambda_4$, $\lambda_5$ and $\lambda_6$ are free parameters which may be selected to achieve the best result for a particular application. We have found that the values $\lambda_1=1$, $\lambda_2=1$, $\lambda_3=20$, $\lambda_4=1$, $\lambda_5=1$, $\lambda_6=0.25$ work well.

The minimization of the cost function may be solved using dynamic programming as previously described. The cost optimization may be performed row by row. In the current row i, we assume all of the cost up to the previous row i−1 are already calculated. The optimal cost and the selected class are recorded for each block. Once we reach the end of the row, the optimal sequence of classes in the row can be tracked from the recorded path. Alternatively implementations might optimize over multiple rows of blocks, or might exactly or iteratively minimize the true cost function in 2 dimensions.

Since the final output class for each pixel is ambiguous due to the block overlap, the final output class is specified by the center region of each block. Once the binary mask is obtained, an image can be separated into layers so that each layer can be data-filled or modified adequately for the encoder.

Figure 5:
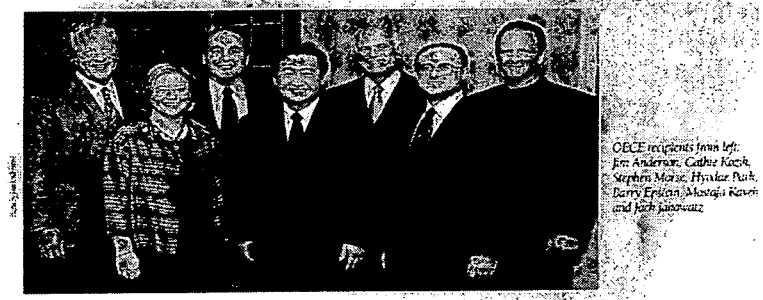
FIG. 5 is a view illustrating an original image and a segmented image of the image coding and/or decoding system of FIGS. 2 and 3.
Figure 5:
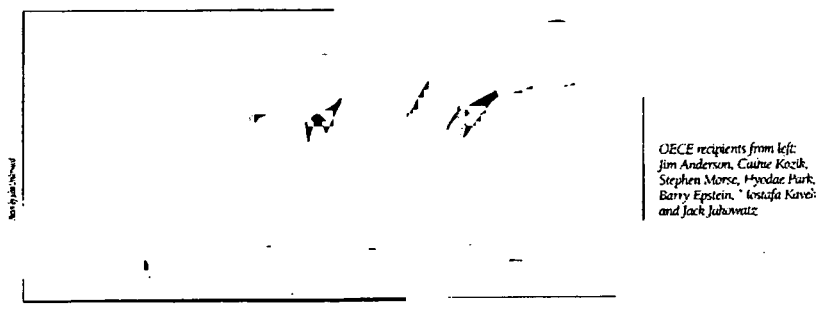

FIG. 5 is a view illustrating an original image and the segmentation result by the COS algorithms. In the segmentation result, black regions indicate a label of "1" (foreground), and white regions indicate a label of "0" (background). Both large and small texts are detected well on the color background. In addition, text regions are reliably classified to the foreground layer, and image regions reliably classified to the background layer.

Figure 6:
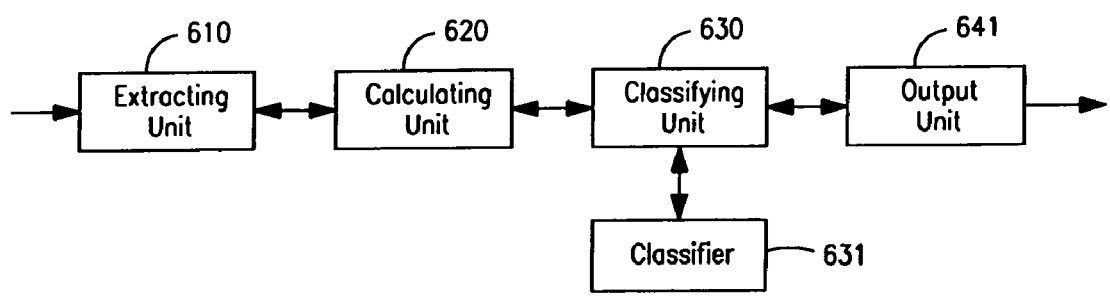
FIG. 6 is a block diagram of a segmentation unit of the image coding and/or deciding system according to an embodiment of the present general inventive concept.

FIG. 6 is a block diagram of the CCC unit 233 of the segmentation unit 230 of the encoding unit 230 of the image coding and/or deciding system 200 according to an embodiment of the present general inventive concept.

Referring to FIGS. 2, 3 and 6, the CCC 233 unit includes an extracting unit 610, a calculating unit 620, a classifying unit 630, and an output unit 640. According to the present embodiment, the CCC (connected component classification) improves the accuracy of segmentation such that segmentation can contain only text in a foreground region (i.e., mask pixels which are labeled as "1"), and all other regions of the document are in the background (i.e., mask pixels which are labeled as "0").

The extracting unit 610 receives an initial segmentation or a final segmentation image from the COS unit 232, and extracts each connected component in the initial segmentation or the final segmentation image. The calculating unit 620 calculates or extracts a feature vector for each connected component, and then the classifying unit 630 classifies data of each connected component as either text component or non-text component, according to the feature vector. The text components remain labeled as "1," and the non-text components are changed to "0," so that image segmentation is formed and output from the output unit 640 according to the classified data. The initial segmentation can be segmentation of the segmented blocks or a segmented image formed from the segmented blocks. The initial segmentation may be an output from the COS unit 232. The initial segmentation or the final segmentation image may also be an output from an external device when the COS unit 232 is not included in the segmentation unit 230. It is also possible that the extracting unit 610 may receive the initial segmentation or the final segmentation image from another unit performing another segmentation algorithm.

Figure 7:
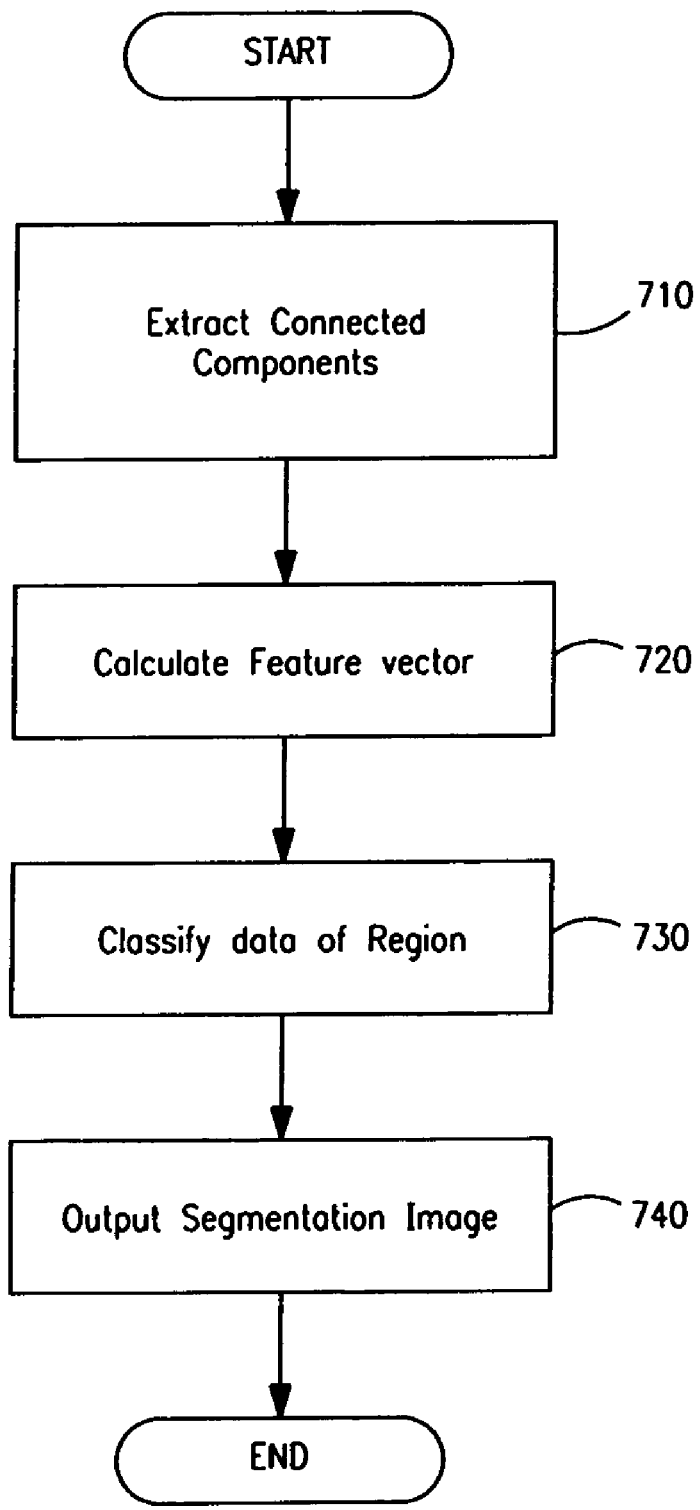
FIG. 7 is a flowchart illustrating a method of a segmentation unit of an image coding and/or decoding system according to an embodiment of the present general inventive concept.

FIG. 7 is a flowchart illustrating a method of a segmentation unit of an image coding and/or decoding system according to an embodiment of the present general inventive concept.

Referring to FIGS. 6 and 7, connected components are extracted from the initial segmentation at operation 710. The feature vector is calculated from the connected components for the respective blocks or the respective regions, i.e., background and foreground regions, at operation 720. The data of the connected components is classified as either text component or non-text component according to the feature vector at operation 730. The data may be a value of the respective pixels of the respective blocks (or initially segmented blocks or initially segmented image). At operation 740, the segmentation output is formed and output to the encoding unit 240 of the encoding apparatus 210 of FIG. 2. Pixel data or block data According to the present embodiment, the CCC unit 233 improves the segmentation accuracy by assigning the feature vector to each connected component from the preliminary segmentation. Compared to conventional algorithms performing segmentation on a block basis independently, the CCC unit 233 of the present embodiment utilizes attributes of connected components. Therefore, the above connected component classification method can be used in combination with a variety of segmentation algorithms to improve the resulting segmentation accuracy.

According to the present embodiment, the method of the CCC unit 233 improves the accuracy of document segmentation algorithms and application in the MRC document encoding. The connected component classification method can also be used to increase the probability of properly detecting text and to reduce the probability of erroneously detecting non-text. More accurate segmentation of text improves the quality and compression ratio of the MRC encoded documents, thereby allowing larger documents to be stored and transmitted with fewer bits. Another advantage of the connected component classification is portability to be used together with other segmentation algorithms and/or to be applied to the results of any MRC document segmentation algorithm.

In order to perform the connected component classification, an N-dimensional feature vector needs to be defined. The feature vector contains calculated values which represent one or more attributes of a connected component. The attribute of the feature vector needs to provide enough information for the connected component to be classified accurately. For example, the mean and variance of an edge depth along a boundary of each connected component are possible choices for feature vector components. These components help to identify the text because text symbols typically have distinct and uniform boundaries.

Once a feature vector is calculated for each connected component, the feature vector is classified as the text or the non-text, and the corresponding connected components are labeled as the text or the non-text. An advantage of the feature vector classification method is that false alarm probability and correct detection probability may be controlled by a classifier (i.e., the classified feature vector as the text and the non-text), which directly influences the quality and compression ratio of the resulting MRC encoding.

Figure 8:
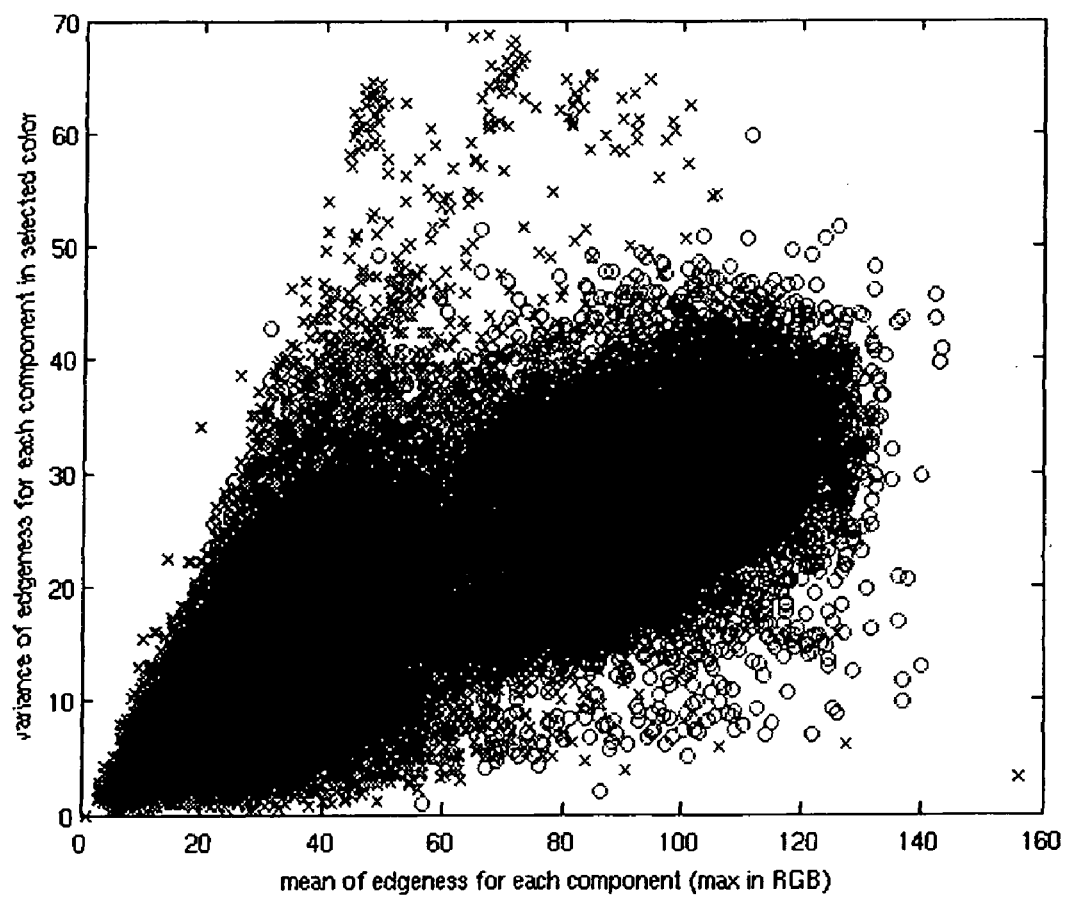
FIG. 8 is a view illustrating a feature vector plot of the segmentation unit of the image coding and/or deciding system of FIGS. 2 and 6.

FIG. 8 is a view illustrating a feature vector plot of the segmentation unit of the image coding and/or deciding system of FIGS. 2 and 6. Referring to FIG. 8, each point in the plot corresponds to a connected component in the initial segmentations of a set of test images. This feature vector may include only two dimensions, i.e., (1) the mean of the edge depth along the boundary for each connected component and (2) the variance of the edge depth along the boundary for each connected component. Red plots (illustrated as gray area) represent the text, and blue plots (illustrated as dark black area) represent picture components. According to these plots (areas), the feature vectors are visually separable.

Figure 9:
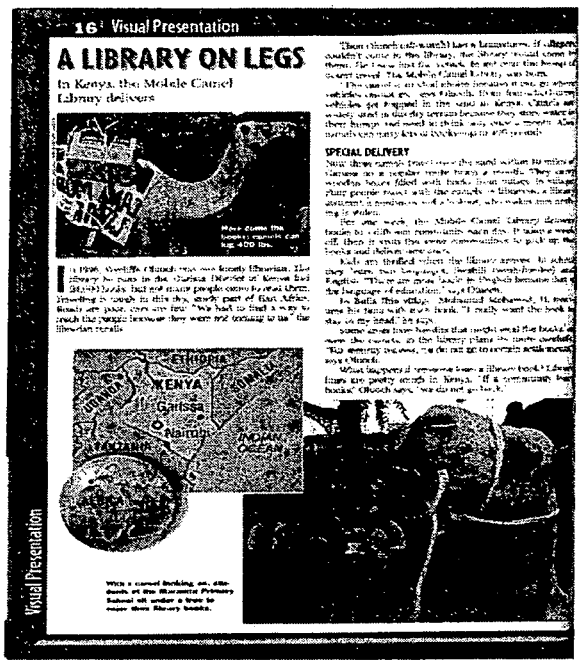
FIG. 9 is a view illustrating an original image, an initial segmentation, and a CCC segmentation formed in the segmentation unit of the image coding and/or deciding system of FIGS. 2 and 6.
Figure 9:
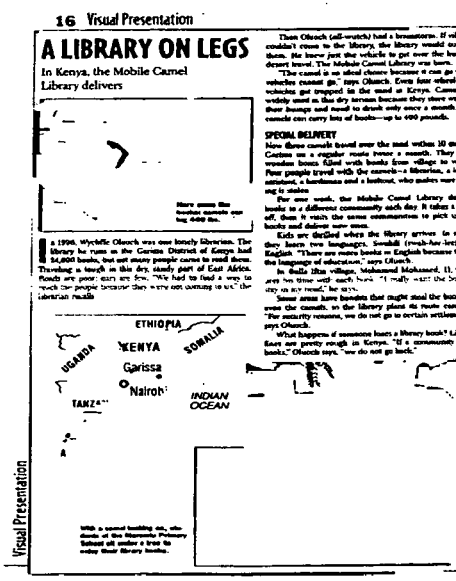
Figure 9:
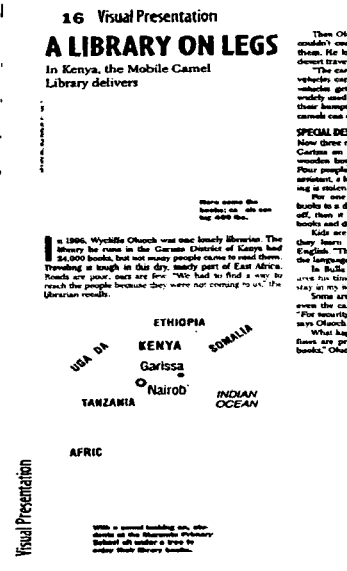

FIG. 9 is a view illustrating an original image, an initial segmentation, and a CCC segmentation formed in the segmentation unit of the image coding and/or decoding system of FIGS. 2 and 6 according to the CCC (connected component classification). According to the present embodiment, only text regions (i.e. black) are extracted from the initial segmentation. The feature vectors may be 10-dimensional, and the feature vectors may be classified using maximum likelihood (ML) classification with a Gaussian mixture model.

A computer readable recording medium

As described above, the image coding and/or decoding system increases a compression ratio and accuracy of the segmentation image according to the cost optimized segmentation and the connected component classification.

As described above, the image coding and/or decoding system can selectively use the COS unit or a conventional segmentation unit to provide the segmentation image to the CCC unit. When the input image includes text only, the CCC unit may not be used in the image coding and/or decoding system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus usable in an image encoding and decoding system, comprising:
    a segmentation unit to divide an image into one or more blocks, to segment the blocks of the image into a binary mask layer of a foreground and a background according to a cost optimized function and a feature vector of the respective blocks, so as to generate an segmentation image.

2. The apparatus of claim 1, wherein the segmentation unit comprises a divider to divide the image into the one or more blocks, and the one or more blocks are disposed adjacent to each other to overlap each other in at least one of first and second directions.

3. The apparatus of claim 1, wherein the segmentation unit comprises a divider to divide the image into the one or more blocks, and each of the one or more blocks comprises same pixels of one or more overlapping areas with the adjacent blocks in at least one of first and second directions.

4. The apparatus of claim 1, wherein the segmentation unit comprises a cost optimized segmentation (COS) unit to define the respective blocks as segmentation candidates, and to modify the segmentation candidates according to the cost optimized function to generate the segmented blocks to form the segmentation image.

5. The apparatus of claim 4, wherein the COS unit comprises:
    a first segmentation unit to define the respective blocks as the segmentation candidates according to a classification of the blocks; and
    a second segmentation unit to modify the segmentation candidates according to the cost optimized function.

6. The apparatus of claim 1, wherein the cost optimized function corresponds to features of the image and consistency of segmentation between neighboring blocks.

7. The apparatus of claim 1, wherein the cost optimized function corresponds to attributes of the blocks, and the attributes of the blocks comprise one of segmentation edges along text and graphics boundaries, a spatially smooth segmentation, an image region classified to a background layer, a text region classified to a foreground layer, an accurate representation of a textual and/or graphic content.

8. The apparatus of claim 1, wherein the cost optimized function corresponds to the number of mismatches between pixels in an overlap region of the adjacent blocks.

9. The apparatus of claim 1, wherein the cost optimized function corresponds to a variance of pixels in an overlap region of the adjacent blocks.

10. The apparatus of claim 1, wherein the cost optimized function corresponds to a constancy of the neighboring blocks.

11. The apparatus of claim 1, wherein the segmentation unit modifies the blocks according to the cost optimized function to control an image quality and a compression rate of the segmentation image.

12. The apparatus of claim 1, wherein the segmentation unit comprises a connected component classification (CCC) unit to modify an initial segmentation image of the blocks of the image according to the feature vector of the initial segmentation image to generate the segmentation image.

13. The apparatus of claim 12, wherein the CCC unit extracts connected components of the adjacent blocks and calculates the feature vector of the respective blocks according to the connected components.

14. The apparatus of claim 13, wherein the CCC unit classifies pixel data of the blocks of the image according to the feature vector to modify the pixel data of the blocks to generate the segmentation image according to the modified pixel data.

15. The apparatus of claim 14, wherein the CCC unit compares the feature vector with a reference vector to modify the pixel data of the blocks of the image.

16. The apparatus of claim 12, wherein the CCC unit classifies a region of the initial segmentation image segmented according to the cost optimized function into a text region and a non-text region according to the feature vector of the adjacent regions of the initial segmentation image.

17. The apparatus of claim 1, wherein the feature vector comprises a text symbol vector and a non-text symbol vector.

18. The apparatus of claim 1, wherein the segmentation unit further modifies the respective blocks segmented according to the cost optimized function, according to the feature vector to output the segmentation image according to the modified blocks.

19. The apparatus of claim 1, wherein the segmentation unit modifies the blocks according to the feature vector in order to control a false alarm probability and a correct detection probability of the segmentation image.

20. The apparatus of claim 1, further comprising:
a scanning unit to scan a document to generate a signal corresponding to the image.

21. The apparatus of claim 1, further comprising:
a printing unit to print a signal corresponding to the segmentation image.

22. An apparatus usable in an image encoding and decoding system, comprising:
a segmentation unit to divide an image into one or more blocks, to segment the blocks into a binary mask layer of a foreground and a background according to a cost optimized function, so as to generate a segmentation image according to the segmented blocks.

23. An apparatus usable in an image encoding and decoding system, comprising:
a segmentation unit to divide an image into one or more blocks, to segment the blocks into a binary mask layer of a foreground and a background according to a feature vector of the respective blocks, so as to generate a segmentation image according to the segmented blocks.

24. An apparatus usable in an image encoding and decoding system, comprising:
a decoding unit to decode an image signal encoded from a segmentation image according to a cost function and a feature vector, so as to generate a decoded image.

25. The apparatus of claim 24, further comprising:
a printing unit to print the decoded image on a sheet of paper.

26. An apparatus usable in an image encoding and decoding system, comprising:
a segmentation unit to divide an image into one or more blocks, to segment the blocks into a binary mask layer of a foreground and a background according to a cost optimized function and a feature vector of the respective blocks, so as to generate a segmentation image according to the segmented blocks; and
a decoding unit to decode a signal corresponding to the segmentation image formed according to the cost function and the feature vector of the blocks of the image, so as to generate a decoded image.

27. The apparatus of claim 26, further comprising:
a printing unit to print the decoded image on a printing medium.

28. The apparatus of claim 26, further comprising:
a scanning unit to scan a document to generate a signal corresponding to the image.

29. A method of an image encoding and decoding system, comprising:
using a computer to perform the operations of:
dividing an image into one or more blocks; and
segmenting the blocks into a binary mask layer of a foreground and a background according to a cost optimized function and a feature vector, so as to generate a segmentation image according to the segmented blocks.

30. A method of an image encoding and decoding system, comprising:
using a computer to perform the operations of:
dividing an image into one or more blocks; and
segmenting the blocks into a binary mask layer of a foreground and a background according to a cost optimized function, so as to generate a segmentation image as a final binary mask layer according to the segmented blocks.

31. A method of an image encoding and decoding system, comprising:
using a computer to perform the operations of:
dividing an image into one or more blocks; and
segmenting the blocks into a binary mask layer of a foreground and a background according to a feature vector of the respective blocks, so as to generate a segmentation image as a final binary mask layer according to the segmented blocks.

32. A method of an image encoding and decoding system, comprising:
using a computer to perform the operations of:
decoding an image signal encoded from a segmented image according to a cost function and a feature vector of blocks divided from an image, so as to generate a decoded image; and
printing the decoded image on a sheet of paper.

33. A method of an image encoding and decoding system, comprising:
using a computer to perform the operations of:
dividing an image into one or more blocks;
segmenting the blocks into a binary mask layer of a foreground and a background according to a cost optimized function and a feature vector, so as to generate a segmentation image according to the segmented blocks; and
decoding a signal corresponding to the segmentation image of the segmented blocks according to the cost function and the feature vector of the blocks divided from the image, so as to generate a decoded image.

34. A non-transitory computer readable recoding medium containing computer readable codes as a program to execute a method of an image encoding and decoding system, the method comprising:
dividing an image into one or more blocks; and
segmenting the blocks into a binary mask layer of a foreground and a background according to a cost optimized function and a feature vector of the respective blocks, so as to generate a segmentation image according to the segmented blocks.

35. A non-transitory computer readable recoding medium containing computer readable codes as a program to execute a method of an image encoding and decoding system, the method comprising:
dividing an image into one or more blocks; and
segmenting the blocks into a binary mask layer of a foreground and a background according to a cost optimized function, so as to generate a segmentation image according to the segmented blocks.

36. A non-transitory computer readable recoding medium containing computer readable codes as a program to execute a method of an image encoding and decoding system, the method comprising:
  dividing an image into one or more blocks; and
  segmenting the blocks into a binary mask layer of a foreground and a background according to a feature vector so as to generate a segmentation image according to the segmented blocks.

37. A non-transitory computer readable recoding medium containing computer readable codes as a program to execute a method of an image encoding and decoding system, the method comprising:
  decoding an image signal encoded from a segmentation image of the segmented blocks according to a cost function and a feature vector, so as to generate a decoded image; and
  printing the decoded image on a sheet of paper.

38. A non-transitory computer readable recoding medium containing computer readable codes as a program to execute a method of an image encoding and decoding system, the method comprising:
  dividing an image into one or more blocks;
  segmenting the blocks into a binary mask layer of a foreground and a background according to a cost optimized function and a feature vector of the respective blocks, so as to generate a segmentation image according to the segmented blocks; and
  decoding a signal corresponding to the segmentation image formed from the segmented blocks according to the cost function and the feature vector, so as to generate a decoded image.

39. An apparatus usable in an image encoding and decoding system, comprising:
  a segmentation unit to divide an image into one or more blocks, to segment and adjust pixel data of the blocks into a binary mask layer of a foreground and a background according to the number of mismatches of the adjacent blocks, so as to generate a segmentation image according to the segmented blocks.

40. An apparatus usable in an image encoding and decoding system, comprising:
  a segmentation unit to divide an image into one or more blocks, to segment the blocks into a binary mask layer of a foreground and a background according to a feature vector of the respective blocks, so as to generate a segmentation image according to the segmented blocks.

* * * * *